United States Patent
Sichi et al.

(10) Patent No.: US 7,369,810 B2
(45) Date of Patent: May 6, 2008

(54) SATELLITE TRANSPONDER ARCHITECTURE WITH INTEGRAL REDUNDANCY AND BEAM SELECTION CAPABILITIES

(75) Inventors: Stephen F. Sichi, Los Angeles, CA (US); Elizabeth J. Klein-Lebbink, El Segundo, CA (US); Lisa Kuo, Rancho Palos Verdes, CA (US)

(73) Assignee: The Boeing Company, Seattle, WA (US)

( * ) Notice: Subject to any disclaimer, the term of this patent is extended or adjusted under 35 U.S.C. 154(b) by 1309 days.

(21) Appl. No.: 09/972,107

(22) Filed: Oct. 5, 2001

(65) Prior Publication Data

US 2003/0068979 A1 Apr. 10, 2003

(51) Int. Cl.
*H04B 7/185* (2006.01)
(52) U.S. Cl. .................. 455/13.3; 455/73; 455/82; 455/133; 333/101; 333/105
(58) Field of Classification Search ................ 455/103, 455/121, 123, 12.1, 13.3, 24, 25; 342/153, 342/173, 352, 358, 360, 372, 375, 374, 384
See application file for complete search history.

(56) References Cited

U.S. PATENT DOCUMENTS

| | | | |
|---|---|---|---|
| 4,070,637 A | 1/1978 | Assal et al. | |
| 4,144,495 A | 3/1979 | Metzger | |
| 4,626,858 A | 12/1986 | Copeland | |
| 4,868,886 A | 9/1989 | Assal et al. | |
| 5,132,694 A | 7/1992 | Sreenivas | |
| 5,649,306 A * | 7/1997 | Vannatta et al. | 455/575.7 |
| 5,822,312 A | 10/1998 | Peach et al. | |
| 5,874,915 A * | 2/1999 | Lee et al. | 342/375 |
| 5,924,031 A | 7/1999 | Copeland et al. | |
| 6,020,796 A * | 2/2000 | Collar et al. | 333/101 |
| 6,169,513 B1 | 1/2001 | Cohen | |
| 6,301,225 B1 * | 10/2001 | Murdock | 370/227 |
| 6,377,558 B1 * | 4/2002 | Dent | 370/321 |
| 6,560,443 B1 * | 5/2003 | Vaisanen et al. | 455/73 |

* cited by examiner

*Primary Examiner*—Binh K. Tieu
(74) *Attorney, Agent, or Firm*—Gates & Cooper LLP

(57) ABSTRACT

A transponder system that integrates redundancy and beam selection capabilities is disclosed. The transponder system comprises an amplifier network having a plurality of amplifiers; an antenna network, comprising a plurality of antennae; an output switching network, including a first output switching network switch, selectably coupling one of the amplifiers to one of the plurality of antennae at a first output switching network switch first switch state and to a second output switching network switch in a first output switch network switch second switch state, wherein the second output switching network switch is selectably coupled to a second one of the plurality of antennae in a second output switching network switch first switch state and to a third one of the plurality of antennae in a second output switching network switch second switch state.

15 Claims, 9 Drawing Sheets

SATELLITE TRANSPONDER ARCHITECTURE WITH INTEGRAL REDUNDANCY AND BEAM SELECTION CAPABILITIES

BACKGROUND OF THE INVENTION

1. Field of the Invention

The present invention relates to systems and methods for transceiving signals, and in particular to a satellite transponder network having integrated redundancy and beamforming/beamswitching capabilities.

2. Description of the Related Art

Satellite transmission systems are well known in the art. One category of such systems use on board transponders that receive signals from one or more ground stations and, with minimal processing (such as frequency translation and amplification), retransmit (transpond) the received signals to other ground stations. Typically, transponders include a plurality of receive antennae communicatively coupled to a plurality of transmit antennae via a switching network.

Because on-orbit servicing of satellite systems is both difficult and prohibitively expensive, the transponders used in such systems are therefore typically designed to provide high reliability and availability.

At the same time, there is a growing need to provide satellite systems with beamswitching and beamforming capabilities. This capability allows transmission of different signals to different geographical areas, and/or adaptive control of transmission signal quality. For example, in areas where rain may degrade the received signal, a beamforming/beamswitching network may be used to strengthen the signal transmitted to such areas.

Traditional switching networks used in such systems offer redundancy or beamforming/beamswitching capability or both, but usually include a vast array of switches, each of which degrade performance, add to cost and complexity, and weight. For example, U.S. Pat. No. 4,626,858 issued to Copeland (which is hereby incorporated by reference herein) uses combiners to merge signals from different beams in a phased array antenna into a single transmission line but does not provide any amplifier redundancy connections. A 6:1 switch is provided to select between different receive beams combinations only, but the switch does not allow selection of both beams and amplifiers.

U.S. Pat. No. 4,868,886 issued to Assal et al. (which is hereby incorporated by reference herein) discloses two designs that focus primarily on beam combining in a phased array in which spare amplifiers are provided (a 6:4 sparing technique is disclosed). However, the system disclosed in Assal operates such that spare amplifiers can only be used in the case of failure of a primary amplifier. The Assal design does not allow all six amplifiers to be used, given sufficient DC power, assuming enough antenna beams were used to utilize this many amplifiers. Assal also discloses a second design in which no redundancy switches or dedicated spare amplifiers are provided, since a matrix type signal combiner is used to share power across the amplifiers. This design can only be used with a multifeed antenna design. What is needed is a system which can be utilized with any multibeam antenna design, and one that allows amplifier sharing.

U.S. Pat. No. 5,132,694 issued to Sreenivas (which is hereby incorporated by reference herein) discloses low level beam forming for a phased array. The system provides dedicated spare amplifiers, however, beam switching is not addressed. The Assal reference teaches using 2-4 backup amplifiers for every 8 active amplifiers required. What is needed is a design that requires no dedicated spare amplifiers and allows the use of every amplifier.

The foregoing designs focus on beam switching as applied to a phased array antenna. All use none, or standard-sparing techniques with dedicated spares. What is needed is a technique that provides combined sparing and beam switching into an integrated ring that also allows any amplifier to be a spare. What is also needed is a design that allows all amplifiers to be used if spacecraft power permits, and is compatible with any multibeam antenna. Furthermore, a system is needed that provides the required redundancy and beamforming/beamswitching capabilities, bit with a minimal number of components. The present invention satisfies that need.

SUMMARY OF THE INVENTION

To address the requirements described above, the present invention discloses a switching apparatus useful in satellite transponder applications and a method of providing a signal to one of a plurality of output devices. The method comprises the steps of receiving the signal in a first switch; selectably coupling the signal to a first output device or a second switch via a first switch according to a first switch selection; and selectably coupling the signal from the first switch to a second output device or a third output device if the signal is not coupled to the first output device via the second switch according to a second switch selection. The apparatus is described by a transponder system comprising an amplifier network having a plurality of amplifiers; an antenna network, comprising a plurality of antennae; an output switching network, including a first output switching network switch, selectably coupling one of the amplifiers to one of the plurality of antennae at a first output switching network switch first switch state and to a second output switching network switch in a first output switch network switch second switch state, wherein the second output switching network switch is selectably coupled to a second one of the plurality of antennae in a second output switching network switch first switch state and to a third one of the plurality of antennae in a second output switching network switch second switch state.

The foregoing reduces the amount of active and passive hardware on a spacecraft while providing a maximum amount of flexibility. This flexibility is implemented while providing equivalent reliability when compared to more traditional architectures.

Cost is minimized by reducing the number and complexity of hardware components. Power requirements are reduced, or, with the same available power, Effective Isotropic Radiated Power (EIRP) can be increased, as lower radio frequency (RF) losses are possible, particularly for high priority or frequently used beams.

The present invention also reduces the need to fly dedicated spare amplifiers, thus allowing all amplifiers to operate as primary. This also allows additional DC power available at beginning of life (BOL) to be utilized by allowing the customer to provide additional capacity for a significant number of years. The present invention also lowers output line losses in primary operation, provides reliability equivalent to that of payloads with a more traditional architecture, reduces hardware count and payload mass, allows flexibility to allow a wide variety of designs be based on a standard architecture, and requires no tailoring of the repeater design for satellites in a large constellation.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
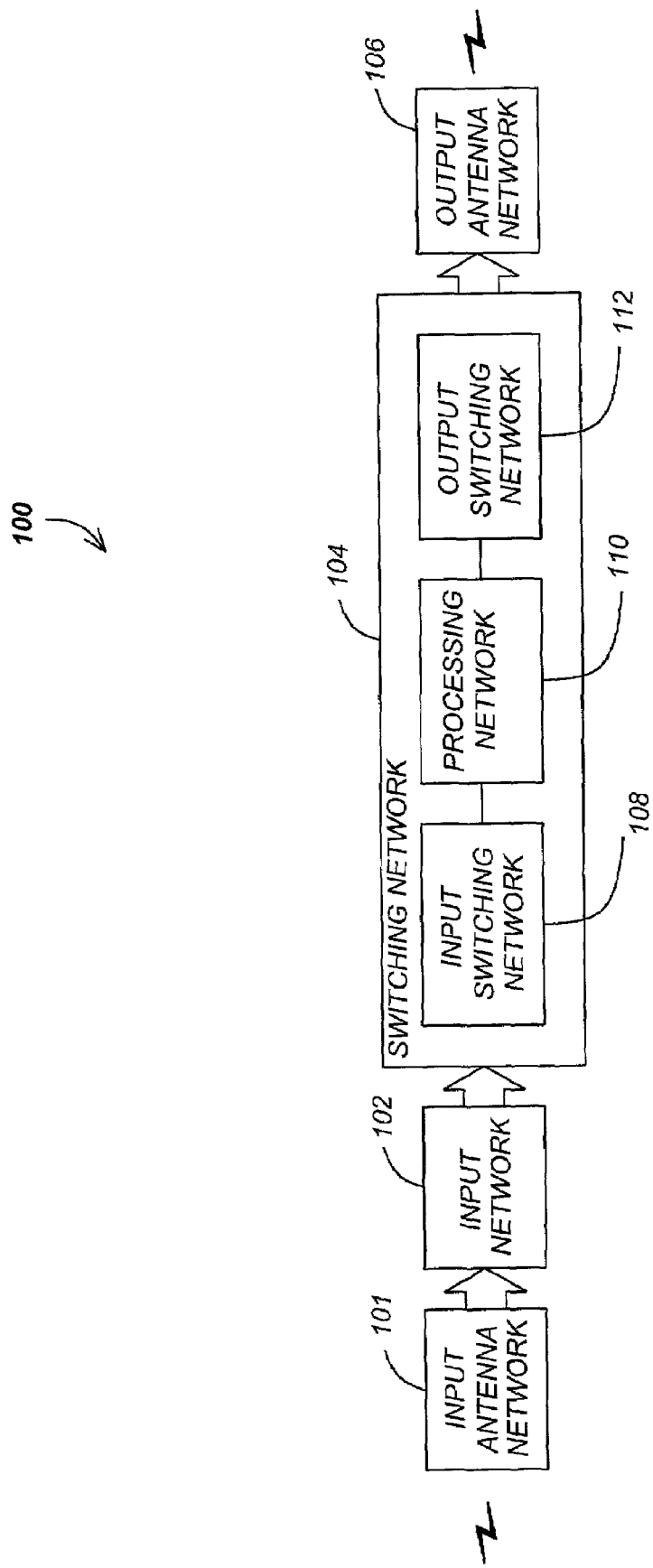
FIG. 1 is a block diagram of a transponder system.

FIG. 1 is a diagram of a transponder system 100. The transponder system 100 comprises an input antenna network 101. The input antenna network 101 accepts signals from a ground station and provides those signals to a communicatively coupled input network 102. The input network 102 is communicatively coupled to a switching network 104, which is communicatively coupled to an antenna network 106. The switching network 104 accepts signals from the input network 102, and by appropriate selection of one or more of a plurality of switches and/or other devices therein, routes the signals from the input network to one or more of the antennae in the antenna network 106. In one embodiment, the switching network 104 includes an input switching network 108 communicatively coupled to the input of a processing network 110, and an output switching network 112 communicatively coupled to the output of the processing network 110.

Figure 2:
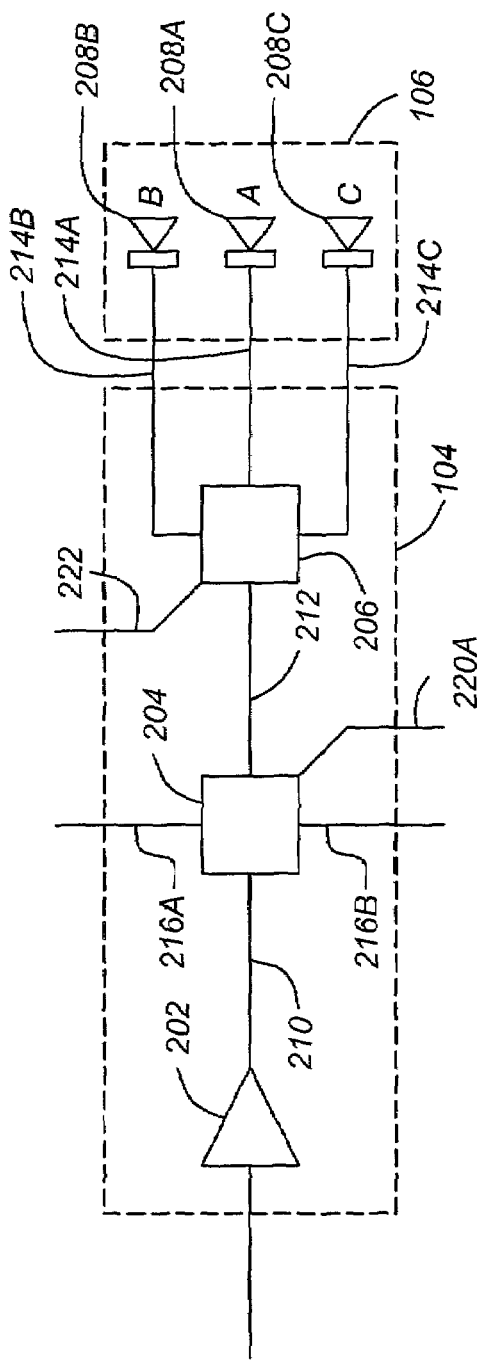
FIG. 2 is a diagram of a typical switching network and antenna network.

FIG. 2 is a diagram showing a typical switching network 104 and antenna network 106. The switching network 104 comprises one or more amplifiers 202 such as traveling wave tube amplifiers (TWTAs), and a plurality of switches 204, 206. Other elements such as dividers, combiners, and the like may also be used in the switching network. The first switch 204 is communicatively coupled to other elements via one of a plurality of links 210, 212, 216A and 216B. The first switch 204 permits the connection of any of the signals at the links 210, 212, 216A and 216B to any of the other links 210, 212, 216A, and 216B, according to a switch signal 220A.

By appropriate selection of the switch 220A, a signal from the amplifier 202 can be directed to link 216A or link 216B (and thereby, to another switch in the switching network 104), or to link 212. Link 212 provides communication between the first switch 204 and the second switch 206. Second switch 206, allows communicative coupling of the signal at link 212 with any of links 214A-214C, according to switch signal 222. By appropriate selection of switches 204 and 206 via switch signals 220A and 222, the signal from the amplifier 202 can be provided to any of the antennae 208A-208C. However, in doing so, the resulting signal path must pass through at least two switches (namely, switch 204 and switch 206. Further, it is not possible to provide a signal from amplifier 202 to antenna 208A, while also providing a signal from another amplifier in the switching network 104 to antenna B 208B.

Figure 3:
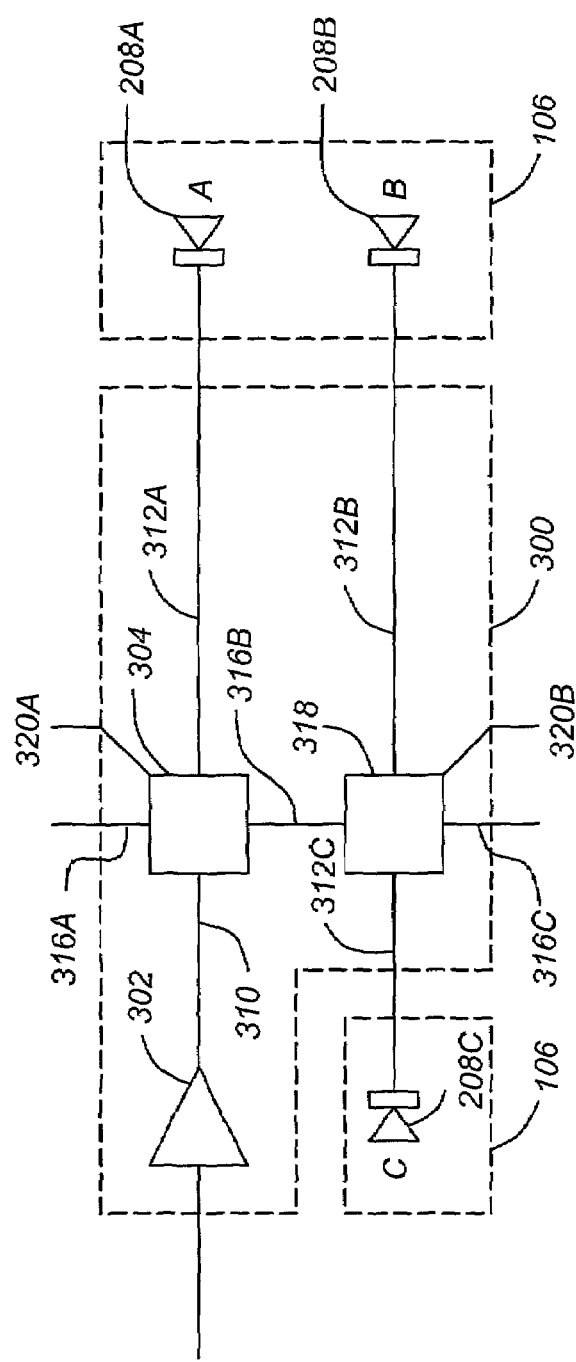
FIG. 3 is a diagram showing one embodiment of the present invention.

FIG. 3 is a diagram showing one embodiment of the present invention. The switching network 104 comprises one or more amplifiers 302 such as TWTAs and a plurality of switches 304, 318. Other elements, such as dividers, combiners, and the like may also be used in the switching network. A first switch 304 is communicatively coupled to other elements via one of a plurality of links 310, 316A, 316B, and 312A. The first switch 304 permits the configuration of the first switch 304 in one of a plurality of switch states to connect of any of the signals at the links 310, 316A, 316B, and 312A to any of the other links 310, 316A, 316B, and 312A according to switch signal 320A.

By appropriate selection of switch 304, a signal at link 310 from amplifier 302 can be provided to any of the links 316A, 316B, or 312A. A primary signal path from amplifier 302 through switch 304 and to antenna A 208A without passing through a plurality of switches (in the illustrated embodiment, signals from the amplifier 302 can be provided to antenna A208 by passing through switch 304 alone, and switch 318 is bypassed). If the output of the amplifier 302 is to be directed to a backup antenna, a secondary, or backup signal path can be established between the amplifier 302 and the backup antenna (antenna B 208B, for example). This is accomplished by routing the signal from link 310 to link 316B via switch 320 by selection of switch signal 320A, from link 316B to link 312B to antenna B 208B through switch 318 via selection of switch signal 320B, or link 316B to link 312C to antenna C 208C through switch 318 via selection of switch signal 320B.

Figure 4:
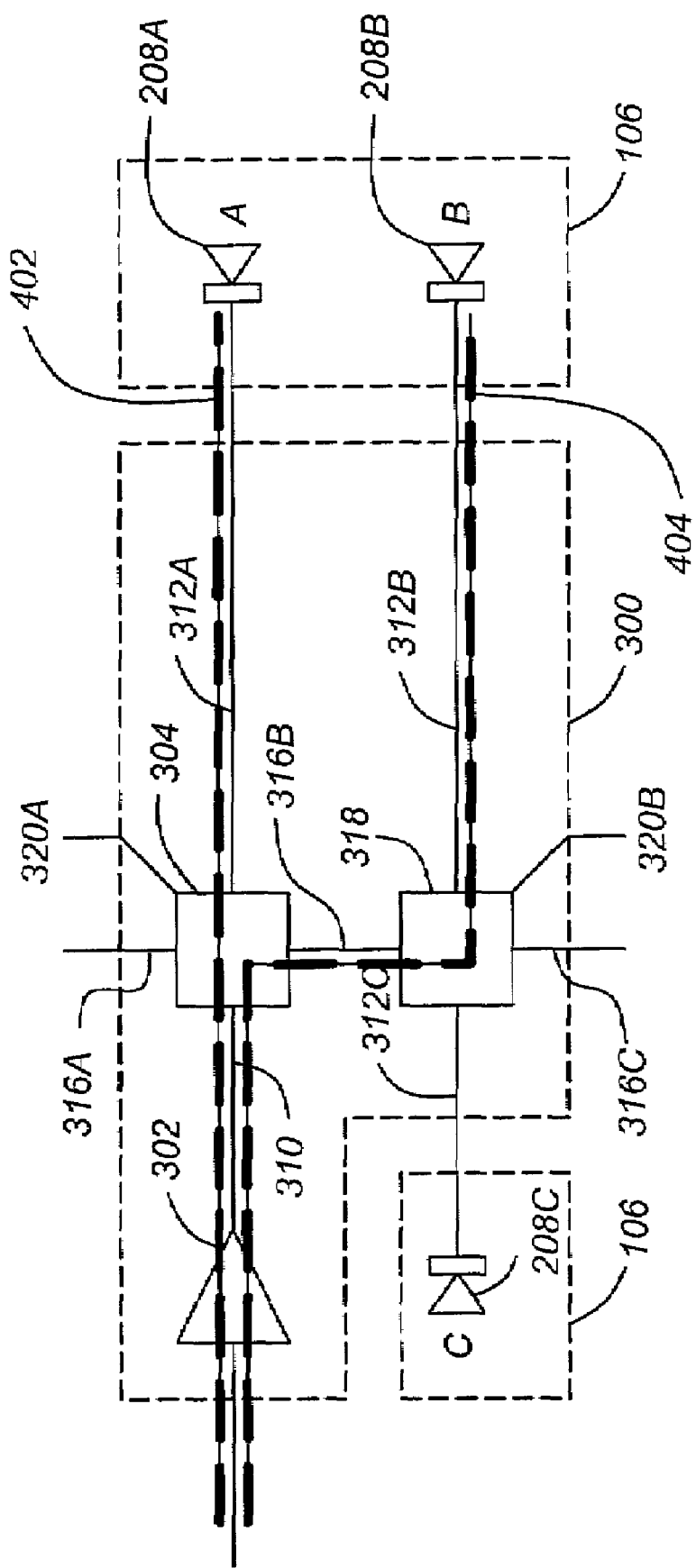
FIG. 4 is a diagram showing a primary signal path and a secondary or backup signal path.

FIG. 4 is a diagram showing a primary signal path 402 from the amplifier 302 to antenna A 208A and a secondary signal path 404 from amplifier 302 antenna B 208B.

Figure 5:
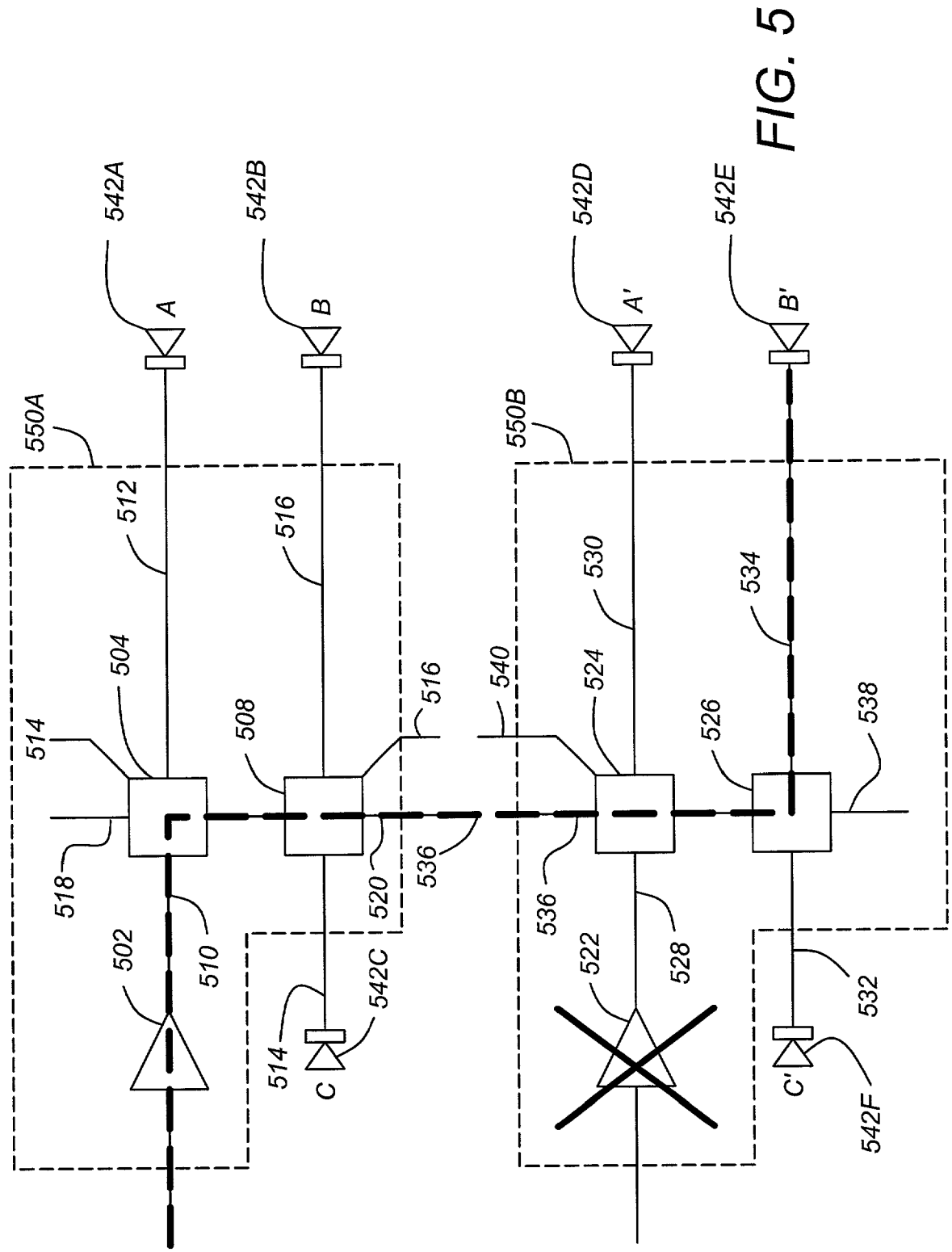
FIG. 5 is a diagram showing how a plurality of cells can be combined to form an expanded switching network.

FIG. 5 is a diagram showing how a plurality of cells 550A and 550B can be combined to form an expanded switching network. In the illustrated embodiment, the first cell 550A of the switching network includes an amplifier 502, a first switch 504 and a second switch 508. In the illustrated embodiment, the first and second switches 504, 508 are 4-way switches similar to switches 304 and 318 described above. A second cell 550B includes an amplifier 522, a first switch 524 and a second switch 526 that also operate similarly to switches 304 and 318. First cell 550A is communicatively coupled to second cell 550B by link 536.

As illustrated in FIG. 5, if amplifier 522 were to be out of service (whether because of on orbit testing, a failure, or other reason), signals can still be applied to antenna B' 502E via signal path 536, as indicated by the heavy dashed line. The illustrated switching network architecture permits a signal from either amplifier 502 and 522 to be applied to any of the antennae 542A-542F.

Figure 6:
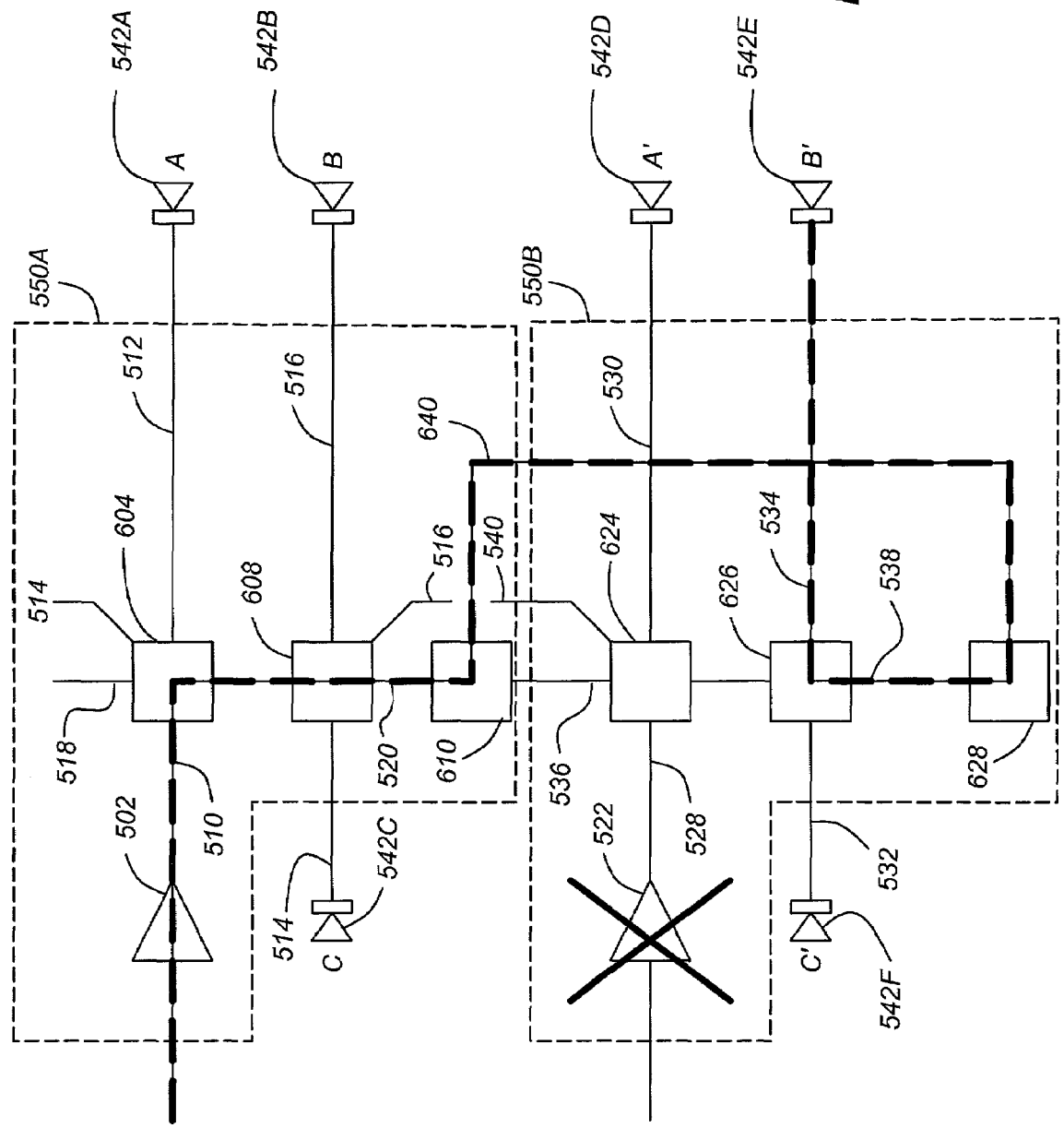
FIG. 6 is a diagram showing another embodiment of the present invention using 3-way switches instead of 4-way switches.

FIG. 6 is a diagram showing another embodiment of the present invention in which the switching network is implemented with 3-way switches rather than 4-way switches. In the illustrated embodiment, the first cell 550A includes an amplifier 502, a first switch 604, a second switch 608, and a third switch 610, wherein the first, second, and third switches (604-610, respectively) are three-way switches. A second cell 550B includes an amplifier 522, a first switch 624, a second switch 626, and a third switch 628. First cell 550A is communicatively coupled to the second cell 550B via links 536 and 640.

As illustrated in FIG. 6, if amplifier 522 were to be out of service, signals can still be applied to antenna B 542E via switches 610 and 628 and signal path 640. The illustrated switching network architecture permits a signal from either amplifier (502 or 522) to be applied to antennae 542A-542F.

Figure 7:
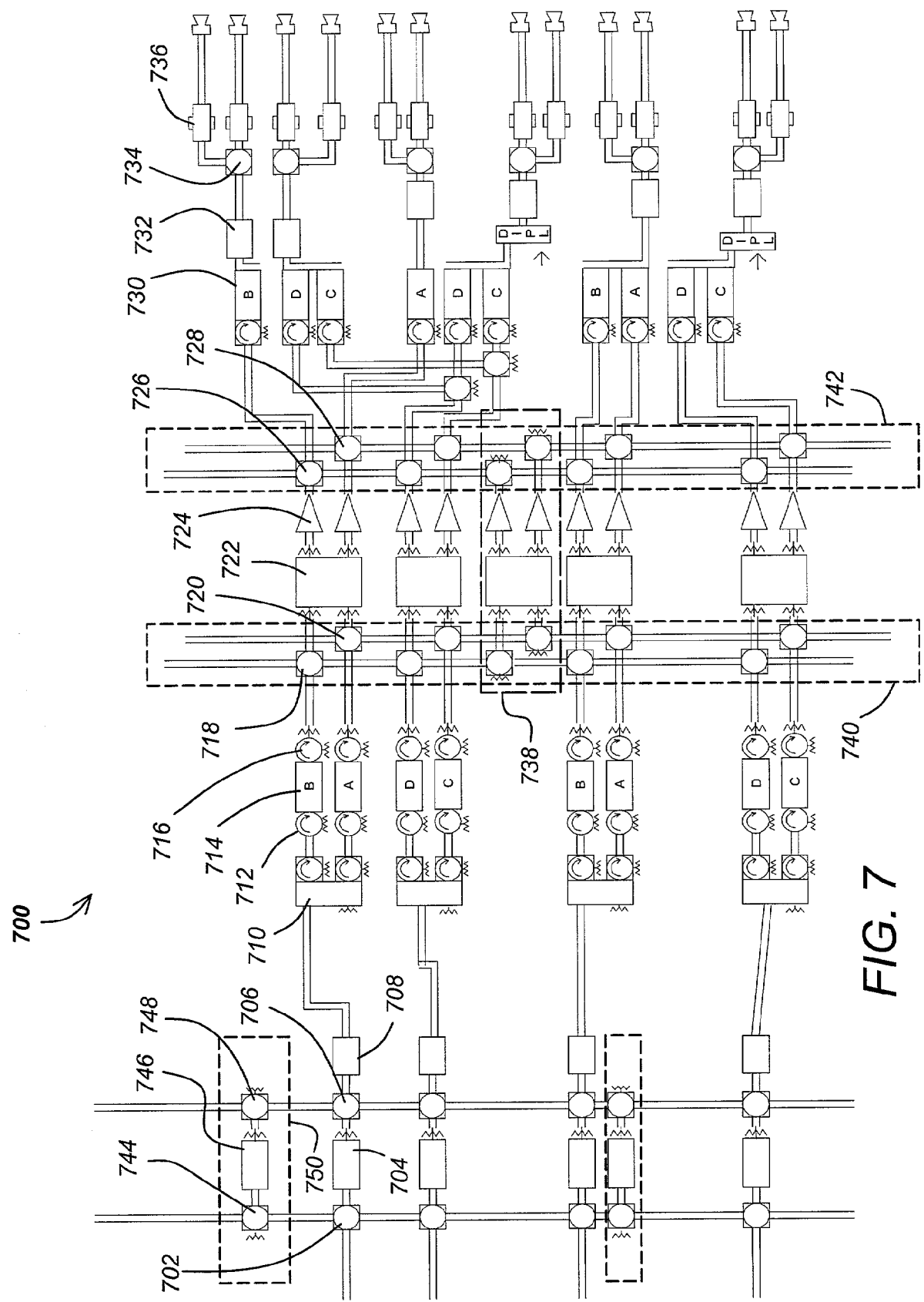
FIG. 7 is a diagram showing an embodiment of a typical transponder architecture using a dual rail switching ring.

FIG. 7 is a diagram showing a typical transponder architecture. The illustrated architecture is capable of providing a subset of 12 spot beams using 8 TWTAs. The architecture includes a plurality of first waveguide switches 702, communicatively coupled to a plurality of second waveguide switches 706 via a frequency converter (such as a down converter or an up converter) 704. The second switch 706 can direct the signal to a filter 708 and thence to a splitter 710, and one of a plurality of channel filters 714. The channel filter 714 output is provided to a first rail 718 of a TWTA redundancy ring. The redundancy ring also comprises a second rail 720. The dual rail redundancy ring is used to assure that a complete failure of the elements within the ring (in this example, the dual driver power conditioners or dual drive amplifiers 722) can be ameliorated by having to switch only one failed TWTA per ring. This offers improved reliability but at the cost of more difficult packaging and longer waveguides, thus increasing output losses. The output from the second redundancy ring 728 provides the output of the TWTA to filters 730 and 732, then finally to a beam select switch 734, which routes the signal to a first antenna 736A or a second antenna 736B.

To meet reliability requirements, the architecture of FIG. 7 requires that the frequency converters 704 array include redundancy modules 750 with switches and spare frequency converters 744-748. Dedicated spare TWTA modules 738 must also be provided, and these dedicated spares cannot be used to power additional spot beams. This effectively requires 4 rows of switches that are usable for redundancy purposes only. Further, after amplification by a TWTA, each signal must pass through the redundancy switch and several beam select switches. This causes additional loss of RF signal strength from the requisite waveguides and switches. If additional beam selection is required, yet another row of switches must be added to the architecture, increasing RF losses and further complicating the design.

Figure 8:
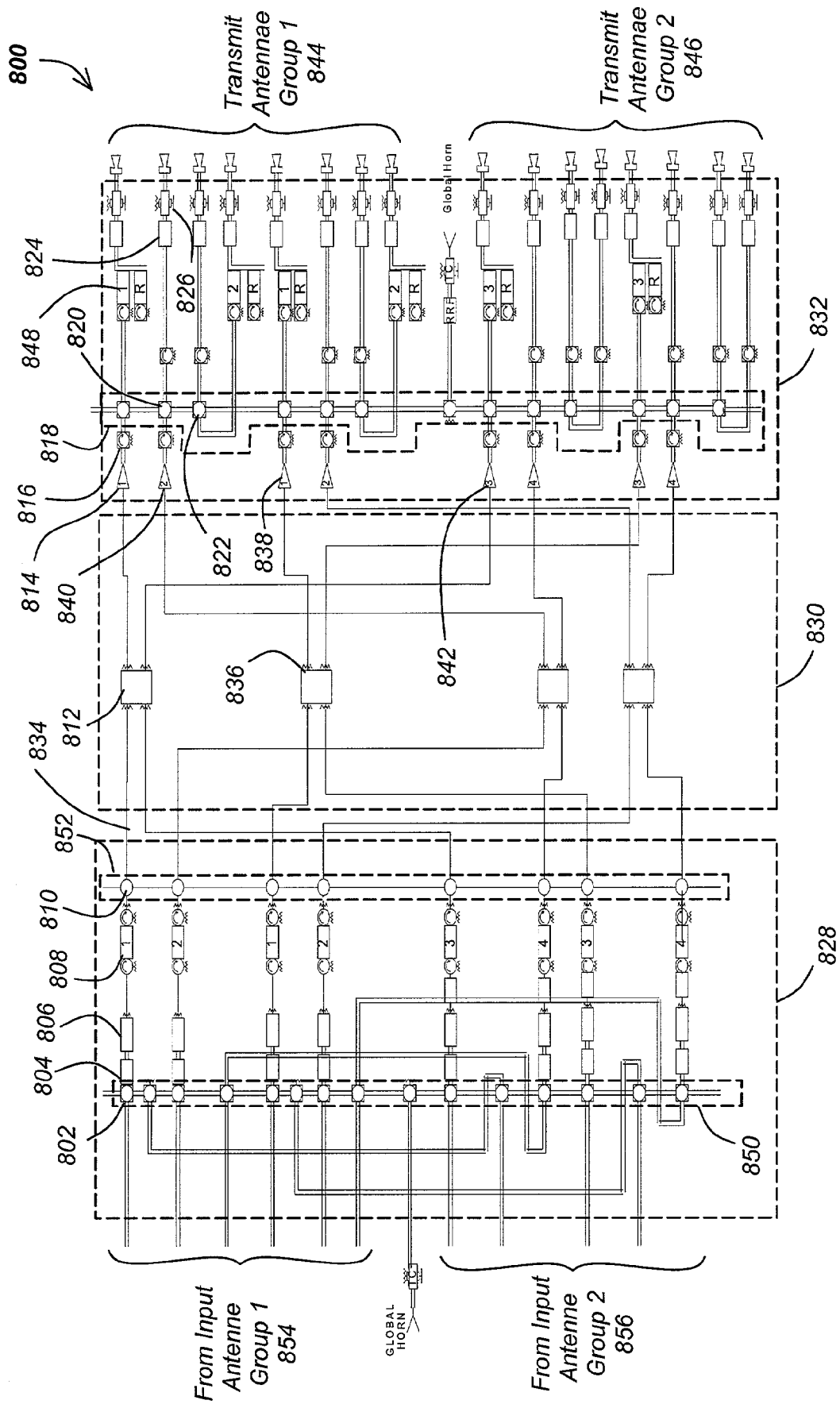
FIG. 8 is a diagram of one embodiment of a switching architecture illustrating the application of the principles of the present invention.

FIG. 8 is a diagram of one embodiment of a switching architecture 800 utilizing the principles of the present invention. The switching architecture 800 includes a first section 828 analogous to the input switching network 108 shown in FIG. 1, a second section 830 analogous to the processing network 110 illustrated in FIG. 1, and a third section 832 analogous to the output switching network 112 of FIG. 1.

A signal is provided from the input antennae group 1 854 and/or input antennae group 2 856 to the first section 828. The first section 828 includes an input switching network 850 which provides the signal one or more of a plurality of channel processing paths, each having a bandpass filter 804, a frequency converter 806, and a channel filter 808. In one embodiment, the input switching network 850 is a single rail switch ring 850.

When used with the output single rail switch ring 818 described further below, the input switching network 850 permits signal routing in four directions. If desired, the switches in the output ring 818 and the input ring 850 can be ganged to that when an switch is selected in the input ring 850, a corresponding switch in the output ring 818 is also selected if required.

Signals from one or more of the channel processing paths are provided to a routing switch network 852 having a plurality of routing switches 810. The routing switch network 852 allows any of the signals provided at the inputs of the routing switch network 852 to be provided to any of the outputs of the routing switch network. In one embodiment, the routing switch network 810 is a single rail switching network.

The routing switches 810 in the routing switch network 852 permit routing of input signals in four directions, and allow a signal appearing on any one of the input paths to the routing switch network 852 to any output path (e.g. path 834) for In-Orbit-Testing (IOT) or other purposes. In non-testing operations, the routing switches permit cross strapping of one converter (e.g. converter 806) to another driver amplifier and TWTA pair (e.g. driver amplifier pair 836 and 838 instead of driver amplifier pair 812 and 814), which increases reliability.

The output of the switching network is provided to the inputs to the second section 830. In the illustrated embodiment, the second section 830 includes driver network having a plurality of drivers 812. Each of the drivers 812 accepts two input signals and provides two output signals. In the illustrated embodiment, the output from each of the drivers 812 are provided to different transmit antennae groups, thus providing redundancy in case one of the drivers 812 fails. The signal outputs from the driver amplifiers 812 are then provided to two TWTAs (e.g. 814 and 842), each of which amplify the applied signal and ultimately provide the amplified signal to a different group of transmit antennae (e.g. TWTA 814 provides a signal to transmit antenna group 1 844 and TWTA 842 provides a signal to transmit antenna group 846). Thus, if one driver (e.g. driver 812) fails, the TWTAs communicatively coupled to the failed driver are not side by side (e.g. coupled to the same group of transmit antennae). This allows the use of a single rail switch ring 818 instead of the dual rail switch ring 742 that is required with traditional architectures. This architecture design can also be implemented with single driver amplifiers as well.

The third section 832 includes the TWTAs (e.g. 814, 840, 838, and 842) communicatively coupled to an output switching network 818. In one embodiment, the output switching network is a single rail switch ring 818. A first (output) single rail switch ring 818 includes a plurality of switches including a first switch 820 and a second switch 822 that operate like switches 504, 508, 524, and 526 depicted in FIG. 5. The third section 832 also comprises other circuit elements such as isolators 816, and filter/multiplexers 848, receive reject filters 824. The use and arrangement of these elements may differ for different transponder designs. Further, the output of the third section 832 can be directed to other circuit or network elements in addition to or in the alternative to the antennae groups.

Figure 9A:
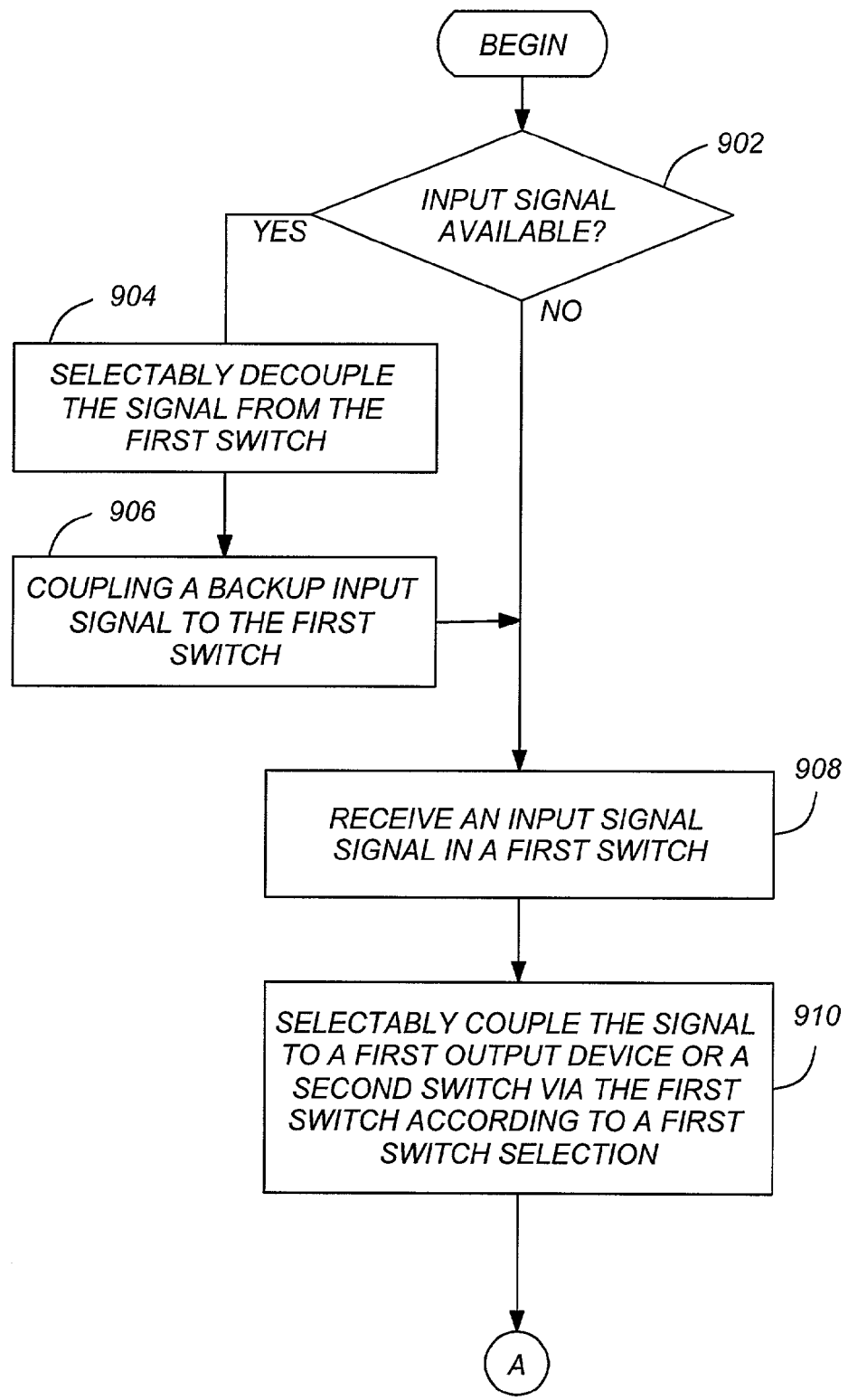
FIGS. 9A-9B present a flow chart describing illustrative method steps used to practice one embodiment of the present invention.
Figure 9B:
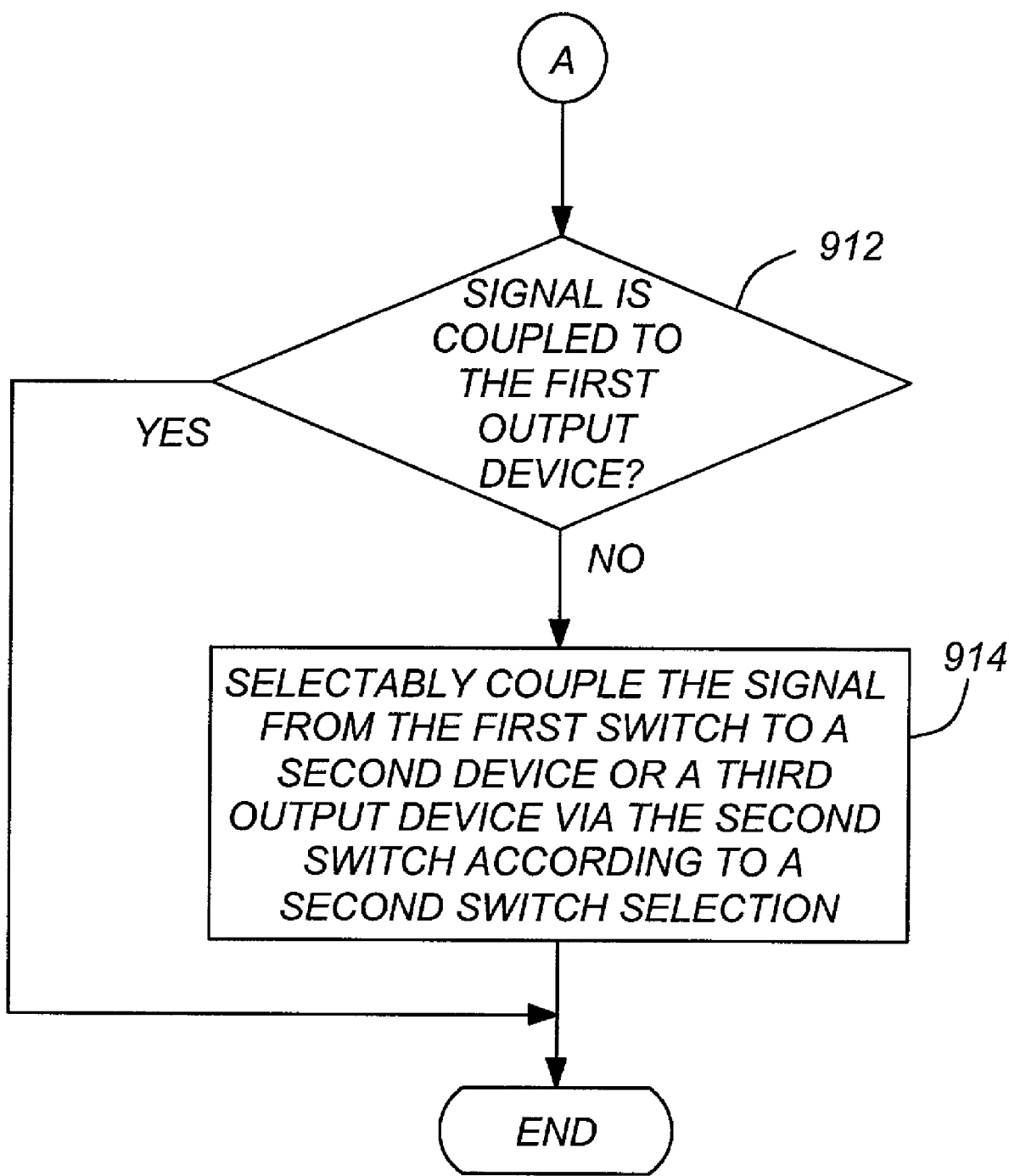

FIGS. 9A and 9B present a flow chart describing illustrative method steps used to practice one embodiment of the present invention. If an input signal is available, at an input to a first switch (e.g. switch 524), it is received, as shown in blocks 902 and 908. This is analogous to the situation presented in FIG. 5 wherein amplifier 522 is operational and the output of the amplifier 522 is applied to the input line 528 of switch 524. If an input signal is not available (analogous to the situation in FIG. 5 wherein amplifier 522 is not operational), a backup signal (e.g., signal provided along line 536 from switch 508) is coupled to the switch (e.g.

switch 524). In block 910, the signal received at the first switch 524 is selectably coupled to a first output device (such as antenna A' 542D) or to a second switch (e.g. switch 526) according to a selection of the first switch 524. If the signal is coupled to the second switch 526 instead of the first output device 542D, the second switch 526 can route the signal to a second output device 542E or a third output device 542F as desired. This is shown in blocks 912 and 914.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An transponder system, comprising:
    an amplifier network having a plurality of amplifiers;
    an antenna network, comprising a plurality of antennae;
    a single rail output switching network, including a first output switching network switch, selectably coupling one of the amplifiers to one of the plurality of antennae at a first output switching network switch first switch stare and to a second output switching network switch in a first output switch network switch second switch state; and
    wherein the second output switching network switch is selectably coupled to a second one of the plurality of antennae in a second output switching network switch first switch state and to a third one of the plurality of antennae in a second output switching network switch second switch state.

2. The transponder system of claim 1, wherein:
    the output switching network defines a plurality of signal paths between a first amplifier of the set of amplifiers and a first antenna of the set of antennae, the communication paths including:
    a first signal path from the first amplifier to the first antenna via the first output switching network switch and not the second output switching network switch; and
    a second signal path from the first amplifier to a second antenna of the antennae network via the first output switching network switch and the second output switching network switch.

3. The transponder system of claim 2, wherein:
    the first signal path is a primary signal path and the second signal path is a backup signal path.

4. The transponder system of claim 1, further comprising:
    an input switching network, having a plurality of input switching network inputs, a plurality of input switching network outputs, and a plurality of input switches selectably communicatively coupling the input switching network inputs with the input switching network outputs, and
    wherein the input switching network outputs are communicatively coupled to the amplifier network.

5. The transponder system of claim 4, wherein the input switching network is a single rail input switching network.

6. The transponder system of claim 5, wherein the input switching network is communicatively coupled to the amplifier network via a routing switch network having a plurality routing switch network inputs communicatively coupled to the plurality of input switching network outputs, a plurality of routing switch outputs communicatively coupled to the amplifier network, and a plurality of routing switches, selectably communicatively coupling the routing switch network inputs to the routing switch network outputs.

7. The transponder system of claim 6, wherein the routing switch network is a single rail input switching network.

8. The transponder system of claim 7, wherein the routing switch network is communicatively coupled to the amplifier network via a driver network having a plurality of driver network inputs communicatively coupled to a plurality of driver network outputs via a plurality of driver network drivers.

9. The transponder system of claim 6, wherein:
    the antenna network comprises a first group of antennae and a second group of antennae;
    each of the driver network drivers is communicatively coupled to an antenna in the first group of antennae and an antennae in the second group of antenna.

10. A network, comprising:
    an first device network having a plurality of first devices;
    a second device network, having a plurality of second devices; and
    a single rail output switching network, communicatively coupling any of the second devices with any of the first devices, wherein the first device network is an antenna network and the first devices are antennae, and the second device network is an amplifier network and the second devices are amplifiers.

11. The network of claim 10, wherein:
    the plurality of first devices includes a first group of first devices and a second group of first devices;
    the plurality of second devices include a first group of second devices associated with the first group of first devices and a second group of second devices associated with the second group of first devices.

12. The network of claim 11, further comprising:
    a third device network, having.
    a plurality of inputs including a first input group and a second input group;
    a plurality of outputs including a first output group and a second output group;
    wherein:
    the first output group is communicatively coupled to the first amplifier group;
    the second output group is communicatively coupled to the second amplifier group;
    each output of the second output group is communicatively coupled to at least one of the inputs in the first input group; and
    each output of the first output group is communicatively coupled to at least one of the inputs in the second input group.

13. The network of claim 12, wherein the first output group is communicatively coupled to the first group of second devices and the second output group is communicatively coupled to the second group of second devices.

14. The network of claim 12, wherein the plurality of third device network inputs are communicatively coupled to a single rail input switching network.

15. The network of claim 12, wherein the third device network comprises a driver network comprising a plurality of drivers or a frequency converter network comprising a plurality of frequency converters.

* * * * *